US012597055B2

(12) United States Patent
Tenneti et al.

(10) Patent No.: US 12,597,055 B2
(45) Date of Patent: Apr. 7, 2026

(54) IDENTIFYING ITEMS OFFERED BY AN ONLINE CONCIERGE SYSTEM FOR A RECEIVED QUERY BASED ON A GRAPH IDENTIFYING RELATIONSHIPS BETWEEN ITEMS AND ATTRIBUTES OF THE ITEMS

(71) Applicant: Maplebear Inc., San Francisco, CA (US)

(72) Inventors: Tejaswi Tenneti, San Carlos, CA (US); Aditya Subramanian, San Francisco, CA (US); Shrikar Archak, Newark, CA (US); Tyler Russell Tate, Lexington, KY (US); Jonathan Lennart Bender, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/509,143

(22) Filed: Nov. 14, 2023

(65) Prior Publication Data

US 2024/0086984 A1      Mar. 14, 2024

Related U.S. Application Data

(63) Continuation of application No. 17/160,759, filed on Jan. 28, 2021, now Pat. No. 11,869,055.

(51) Int. Cl.
*G06Q 30/0601* (2023.01)
*G06F 16/2457* (2019.01)
(Continued)

(52) U.S. Cl.
CPC ... *G06Q 30/0617* (2013.01); *G06F 16/24578* (2019.01); *G06F 16/248* (2019.01);
(Continued)

(58) Field of Classification Search
CPC ........... G06Q 30/0617; G06Q 30/0629; G06Q 30/0625; G06F 16/24578; G06F 16/248; G06F 16/9024
(Continued)

(56) References Cited

U.S. PATENT DOCUMENTS 8,982,129 B1      3/2015 Broekhuijsen
11,228,505 B1 *   1/2022 Wang .................... H04L 41/142
(Continued)

FOREIGN PATENT DOCUMENTS

CA      2757771 A1      10/2010

OTHER PUBLICATIONS

Canadian Intellectual Property Office, Office Action, Canadian Patent Application No. 3,107,608, Apr. 1, 2022, five pages.
(Continued)

*Primary Examiner* — Amy Ng
*Assistant Examiner* — Antonio J Caiado
(74) *Attorney, Agent, or Firm* — Fenwick & West LLP

(57) ABSTRACT

An online concierge system generates a graph connecting items with attributes of the items and other items. Hence, the graph includes nodes corresponding to attributes and nodes corresponding to items, with an item connected to attributes of the item in the graph. Example attributes include a brand, a category, a department, or any other suitable information about the item. When the online concierge system receives a search query to identify one or more items from a customer, the online concierge system parses the search query into combinations of terms and compares different combinations of terms to the graph to determine connections between different combinations of terms in the graph. Based on measures of connectedness between combinations of terms and connections in the graph, items are identified from (Continued)

one or more combinations of terms. Information about the identified items is presented to the customer.

18 Claims, 7 Drawing Sheets

(51) Int. Cl.
*G06F 16/248* (2019.01)
*G06F 16/901* (2019.01)

(52) U.S. Cl.
CPC ..... *G06F 16/9024* (2019.01); *G06Q 30/0625* (2013.01); *G06Q 30/0629* (2013.01)

(58) Field of Classification Search
USPC ...................................................... 705/26.63
See application file for complete search history.

(56) References Cited

U.S. PATENT DOCUMENTS

| | | | |
|---|---|---|---|
| 2007/0038615 A1* | 2/2007 | Vadon ................... G06F 40/274 |
| 2010/0191619 A1 | 7/2010 | Dicker et al. |
| 2011/0093488 A1 | 4/2011 | Amacker et al. |
| 2012/0310731 A1* | 12/2012 | Li .......................... G06Q 30/02 |
| | | | 705/14.69 |
| 2013/0218899 A1* | 8/2013 | Raghavan ........... G06F 16/9024 |
| | | | 707/E17.083 |
| 2014/0278986 A1 | 9/2014 | Rouse et al. |
| 2015/0112790 A1 | 4/2015 | Wolinsky et al. |
| 2017/0228808 A1 | 8/2017 | Kumar et al. |
| 2017/0287053 A1 | 10/2017 | Page et al. |
| 2017/0337584 A1* | 11/2017 | Najdecki ............ G06Q 30/0257 |
| 2019/0205973 A1 | 7/2019 | Gutnik et al. |
| 2019/0236093 A1* | 8/2019 | Andavarapu ......... G06F 16/432 |
| 2019/0236525 A1* | 8/2019 | Stanley ................. G06N 20/20 |
| 2019/0236740 A1 | 8/2019 | Rao et al. |
| 2020/0065857 A1* | 2/2020 | Lagi ................... G06Q 30/0254 |
| 2020/0160428 A1 | 5/2020 | Calvo et al. |
| 2020/0279000 A1* | 9/2020 | Yamamoto ........... G06F 40/289 |
| 2021/0004634 A1 | 1/2021 | Kale et al. |
| 2021/0118034 A1 | 4/2021 | Indrakanti et al. |

OTHER PUBLICATIONS

United States Office Action, U.S. Appl. No. 17/160,759, filed Aug. 19, 2022, 39 pages.
United States Office Action, U.S. Appl. No. 17/160,759, filed Dec. 28, 2022, 50 pages.

* cited by examiner

<u>100</u>

400

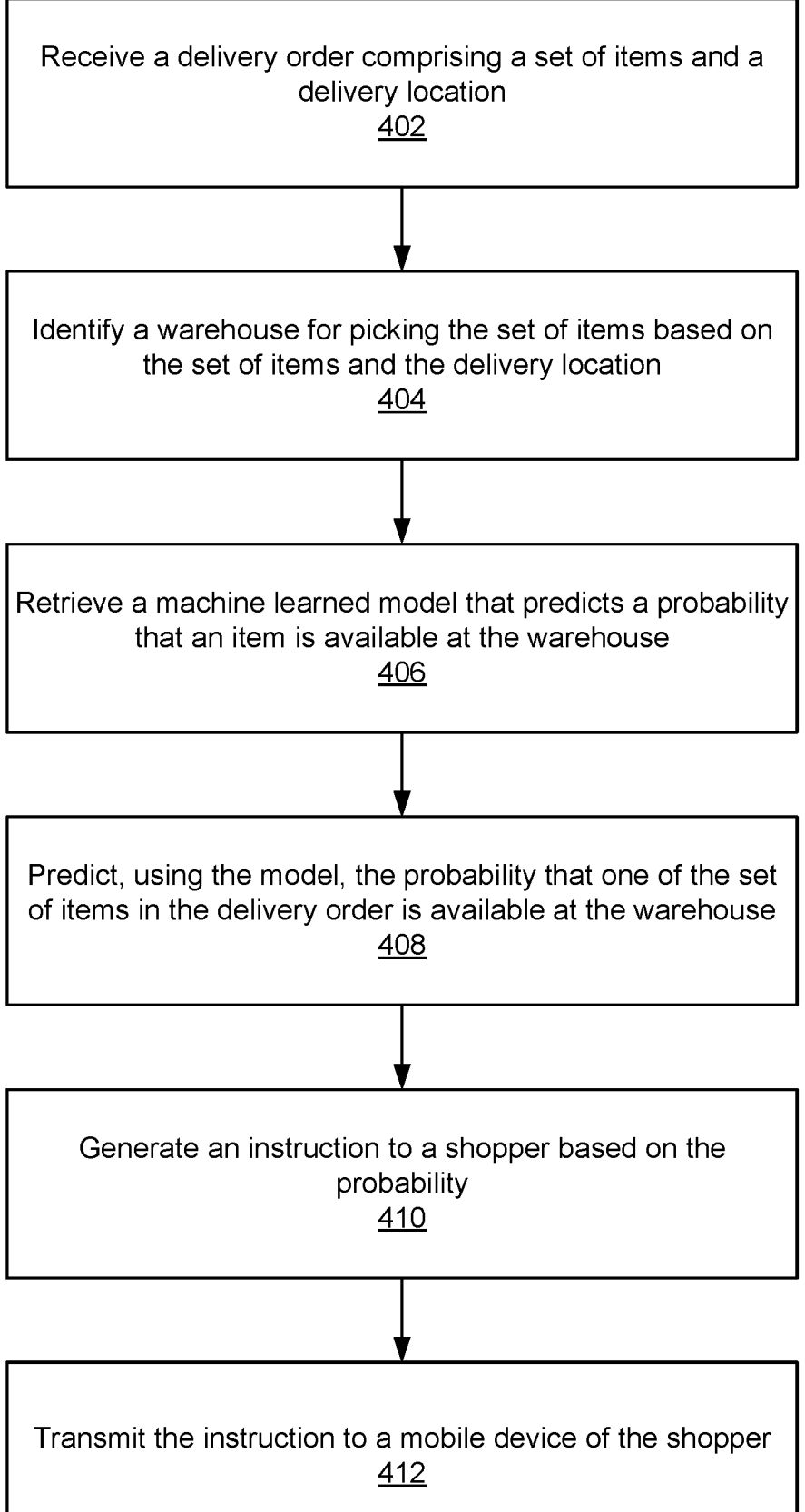

Receive a delivery order comprising a set of items and a delivery location
402

Identify a warehouse for picking the set of items based on the set of items and the delivery location
404

Retrieve a machine learned model that predicts a probability that an item is available at the warehouse
406

Predict, using the model, the probability that one of the set of items in the delivery order is available at the warehouse
408

Generate an instruction to a shopper based on the probability
410

Transmit the instruction to a mobile device of the shopper
412

Identify an item-warehouse pair
502

Determine a confidence score associated with a probability that an item is available at a warehouse
504

If the confidence score is below a threshold, instruct a shopper to collect new information about the item
506

Update training dataset with information about the item
508

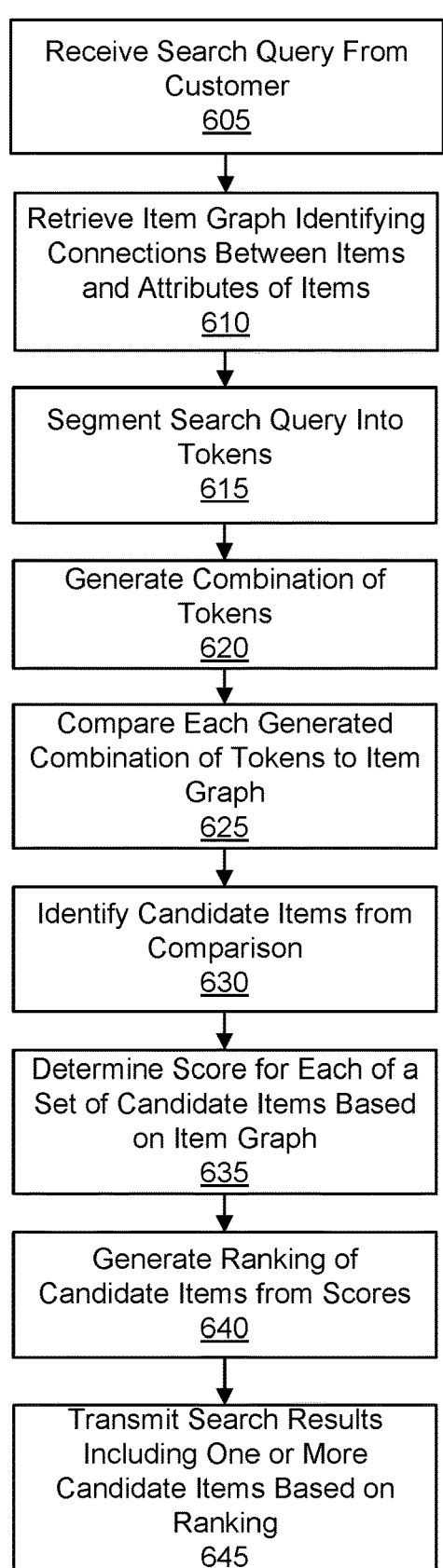

Receive Search Query From
Customer
605

Retrieve Item Graph Identifying
Connections Between Items
and Attributes of Items
610

Segment Search Query Into
Tokens
615

Generate Combination of
Tokens
620

Compare Each Generated
Combination of Tokens to Item
Graph
625

Identify Candidate Items from
Comparison
630

Determine Score for Each of a
Set of Candidate Items Based
on Item Graph
635

Generate Ranking of
Candidate Items from Scores
640

Transmit Search Results
Including One or More
Candidate Items Based on
Ranking
645

FIG. 6

IDENTIFYING ITEMS OFFERED BY AN ONLINE CONCIERGE SYSTEM FOR A RECEIVED QUERY BASED ON A GRAPH IDENTIFYING RELATIONSHIPS BETWEEN ITEMS AND ATTRIBUTES OF THE ITEMS

CROSS REFERENCE TO RELATED APPLICATIONS

This application is a continuation of co-pending U.S. application Ser. No. 17/160,759, filed Jan. 28, 2021, which is incorporated by reference in its entirety.

BACKGROUND

This disclosure relates generally to ordering an item through an online concierge system, and more specifically to identifying items for a search query received by the online concierge system.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

When generating the interface to a consumer from which the consumer selects one or more items, the online concierge system receives information identifying items offered by a warehouse from the warehouse and generates the interface from the information received from the warehouse. The online concierge system may categorize the items identified by the warehouse from the received information and use the categorization when generating the interface. For example, the online concierge system leverages information from the warehouse describing items offered by the warehouse so the items are categorized to replicate their placement in aisles within the warehouse.

However, when a customer provides a search query to the online concierge system, terms in the search query may not accurately or fully map to terms describing items offered by the warehouse. Similarly, information the warehouse provides describing one or more items may include limited information about the items, limiting a number of search terms provided by customers that match information about the items. In the preceding examples, without receiving specific search terms matching information about an item provided by the warehouse from a customer, an online concierge system is unable to include the item in search results provided by the online concierge system to the customer. Further, when the online concierge system receives limited information from a warehouse describing items, the online concierge system is often unable to identify an item when a search query includes synonyms for terms in the information describing an item rather than the terms obtained from the warehouse.

SUMMARY

When a customer is adding one or more items to an order, an online concierge system may receive a search query from the customer through an interface. The search query includes one or more search terms for identifying one or more items the customer seeks to purchase via the online concierge system. For example, the online concierge system receives a selection of a warehouse for fulfilling an order from the customer and then receives a search query to identify one or more items offered by the selected warehouse.

However, search terms in the received search query may not correspond to specific items offered by the warehouse or may partially identify multiple items offered by the warehouse. To identify items matching one or more of the search terms included in the search query, the online concierge system retrieves an item graph stored by the online concierge system. The item graph comprises a plurality of nodes, with each node corresponding to an item available through the online concierge system or corresponding to an attribute of an item available through the online concierge system. Additionally, the item graph includes connections between various pairs of nodes. A connection between a node corresponding to an attribute and a node corresponding to an item indicates that the attribute is associated with the item. The online concierge system generates the item graph based on a product catalog received from the warehouse, where each entry in the product catalog includes information identifying an item (e.g., an item identifier, an item name) and one or more attributes of the item. Example attributes of an item include: one or more keywords, a brand offering the item, a manufacturer of the item, a type of the item, and any other suitable information. Additionally, one or more attributes of an item may be specified by the online concierge system for the item. Example attributes specified by the online concierge system for an item include: a category for the item, one or more sub-categories for the item, and any other suitable information for the item. Attributes specified by the online concierge system have corresponding nodes that are connected to a node for the item in the item graph.

In various embodiments, a connection (or "edge") between attributes in the item graph includes one or more values representing a measure of connectedness between the pair of attributes that are connected. The value included in a connection between attributes is based on prior customer actions when ordering items from the online concierge system. For example, a value of a connection between an attribute and an additional attribute is based on a frequency with which an item having the attribute is included in an order by a customer along with an item having the additional attribute. As another example, the value of the connection between the attribute and the additional attribute is based on a number of times an item having the attribute is included in an order by a customer along with an item having the additional attribute. The online concierge system modifies the measure of connectedness between attributes in the item graph over time as customers include items connected to various attributes in orders received by the online concierge system. This allows the online concierge system to maintain information identifying relationships between different attributes of items as well as the relationships between attributes and items based on items included in orders previously received by the online concierge system and information about items received by the online concierge system.

The online concierge system segments the received search query into tokens, with each token comprising one or more search terms included in the search query. The online concierge system may use any suitable method for segmenting the received search query. For example, the online concierge system identifies one or more specific delimiter characters in the received search query and segments the search terms in the search query into tokens separated by the specific delimiter characters. As an example, a specific delimiter character is a space, so the online concierge system segments the received search query into tokens that are individual words included in the search query. Alternatively, the online concierge system maintains a trained machine learned model for segmenting the received search query into tokens and applies the trained machine learned model to the received search query to segment the received search query into tokens.

From the tokens identified from the search query, the online concierge system generates multiple combinations of tokens. In some embodiments, the online concierge system generates each possible combination of tokens from the segmented search query. The online concierge system compares each generated combination of tokens to nodes in the item graph. Comparing a combination of tokens to nodes in the item graph accounts for an attribute in the item graph matching one or more tokens in the combination or an item in the item graph matching one or more tokens in the combination and connections between the item or attribute matching one or more of the tokens in the combination and other attributes or items. When a combination of tokens includes one or more tokens matching an attribute in the item graph, the online concierge system traverses the item graph using connections between the attribute matching one or more of the tokens in the combination to identify an item connected to the attribute matching one or more of the tokens in the combination. Items connected to one or more attributes matching one or more tokens in the combination are identified as candidate items for display as search results.

In various embodiments, the online concierge system stores a mapping between tokens and alternative terms. For example, the mapping associates a token with one or more synonyms for the token. When comparing a combination of tokens to the nodes in the item graph, the online concierge system retrieves synonyms for one or more tokens from the mapping and compares one or more synonyms for a token to nodes in the item graph, allowing the online concierge system to account for variations in how different customers provide search terms for one or more items to the online concierge system. In various embodiments, the online concierge system generates the mapping based on search terms previously received from customers and attributes of items that the customers selected for inclusion in orders after receiving search results for the previously received search terms.

When comparing a combination of tokens to the item graph, the online concierge system accounts for connections between attributes to identify candidate items. In various embodiments, the online concierge system determines an additional attribute connected to the attribute matching one or more tokens in the combination via the item graph and identifies an item connected to the additional attribute as a candidate item for display. In various embodiments, the online concierge system determines a score for candidate items based on a number of attributes that match one or more tokens in the combination connected to the candidate item based on connections between the candidate item and attributes in the item graph. Hence, a candidate item connected to a greater number of attributes matching one or more tokens in the combination has a higher score. Additionally, when scoring a candidate item, the online system may account for a number of connections between the candidate item and an attribute matching one or more tokens in the combination. For example, the online concierge system assigns a weight to an attribute matching one or more tokens in the combination that is inversely related (e.g., inversely proportional) to a number of connections between the candidate item the attribute matching one or more tokens in the combination. The score for the candidate item is determined by combining the weighted attributes matching one or more tokens of the combination. Hence, a candidate item indirectly connected to attributes matching one or more tokens of the combination has a lower score than a content item directly connected to attributes matching one or more tokens of the combination. When determining the score for a candidate item, the online concierge system may generate a score for the candidate item based on comparison of different alternative terms for tokens in the combination to the item graph, and determine the score for the candidate item as a maximum score of the scores determined for different alternative of the tokens in the combinations. This allows the online concierge system to leverage connections between attributes in the item graph to identify candidate items based on a search query, while accounting for distance between candidate items and attributes matching one or more tokens in a combination generated from the search query.

When scoring a candidate item, the online concierge system may account for prior actions by customers. As described above, a connection between an attribute and another attribute may include a value based on inclusion of an item having the attribute in previously received orders along with one or more other items having the other attribute. In various embodiments, a weight of a connection between a candidate item and attribute that is connected to an additional attribute that matches one or more tokens in the combination is modified based on the value of the connection between the attribute and the additional attribute. For example, greater values of the connection between the attribute and the additional attribute increase the weight of the connection between the candidate item and the attribute, while lower values of the connection between the attribute and the additional attribute decrease the weight of the connection between the candidate item and the attribute. This allows the online concierge system to account for prior interactions by customers with items having different attributes when determining relatedness or similarity between the different attributes. As the value of a connection between an attribute and an additional attribute may change as the online concierge system receives orders from customers, the similarity between attributes connected to each other in the item graph may be modified over time.

Based on the scores determined for candidate items identified for one or more combinations of tokens from the search query, the online concierge system generates a ranking of candidate items. In some embodiments, the online concierge system generates a ranking of candidate items identified for each combination of tokens from the search query. Alternatively, the online concierge system generates the ranking to include candidate items satisfying one or more criteria. For example, the online concierge system selects candidate items having at least a threshold score and generates the ranking from the selected candidate items. In various embodiments, the online concierge system generates the ranking so candidate items with higher scores have higher positions in the ranking.

Based on the ranking, the online concierge system displays search results including one or more of the candidate items to the customer. For example, the online concierge system selects candidate items having at least a threshold position in the ranking and displays the selected candidate items as the search results. The search results display the candidate items in an order determined by the ranking in various embodiments. Alternatively, the online converge system selects candidate items having at least a threshold score and displays the selected candidate items as the search results.

BRIEF DESCRIPTION OF THE DRAWINGS

FIG. 4 is a flowchart of a process for predicting inventory availability, according to one embodiment.

FIG. 6 is a flowchart of a method for identifying one or more items matching a search query received from a customer using an item graph maintained by an online concierge system, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
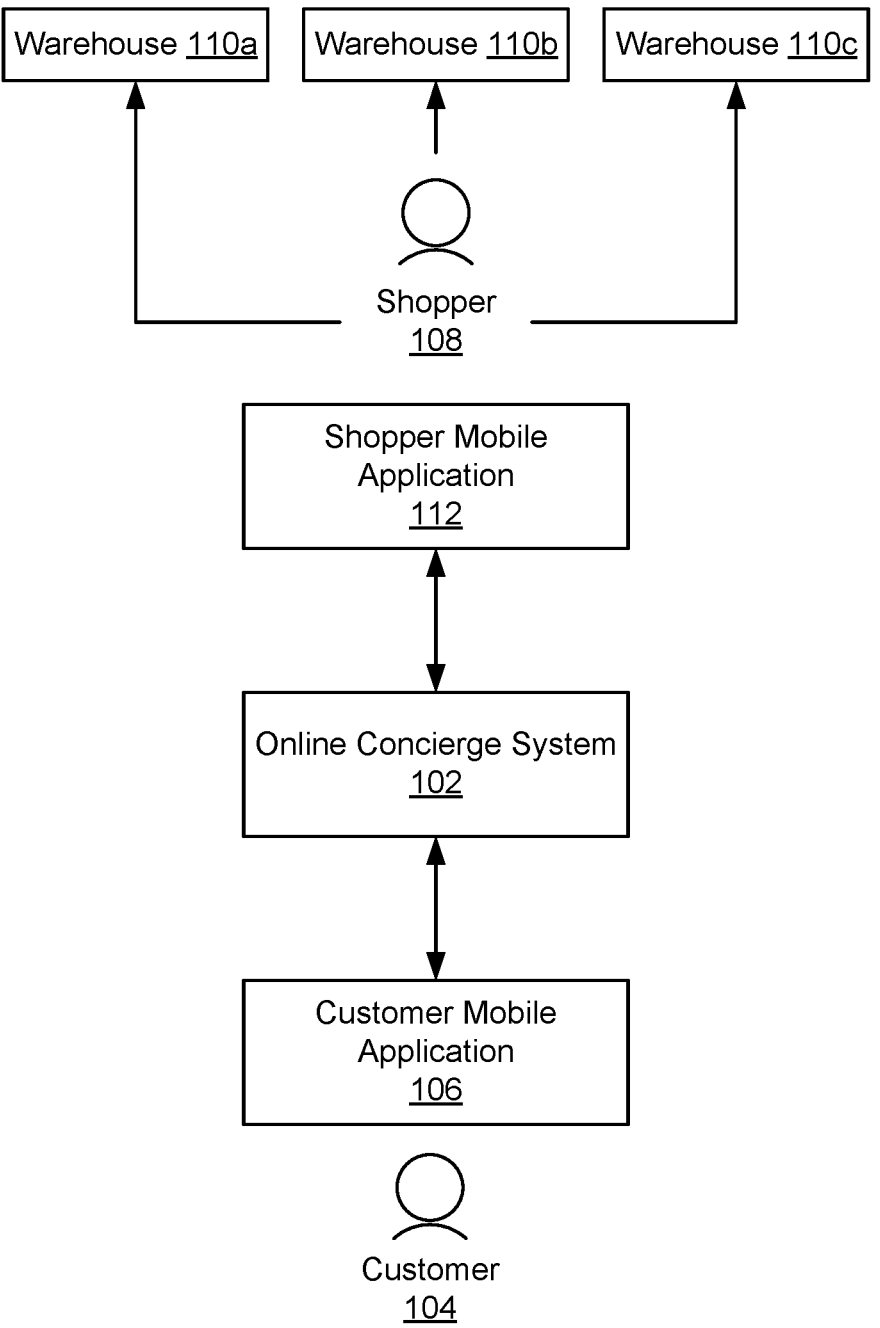
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
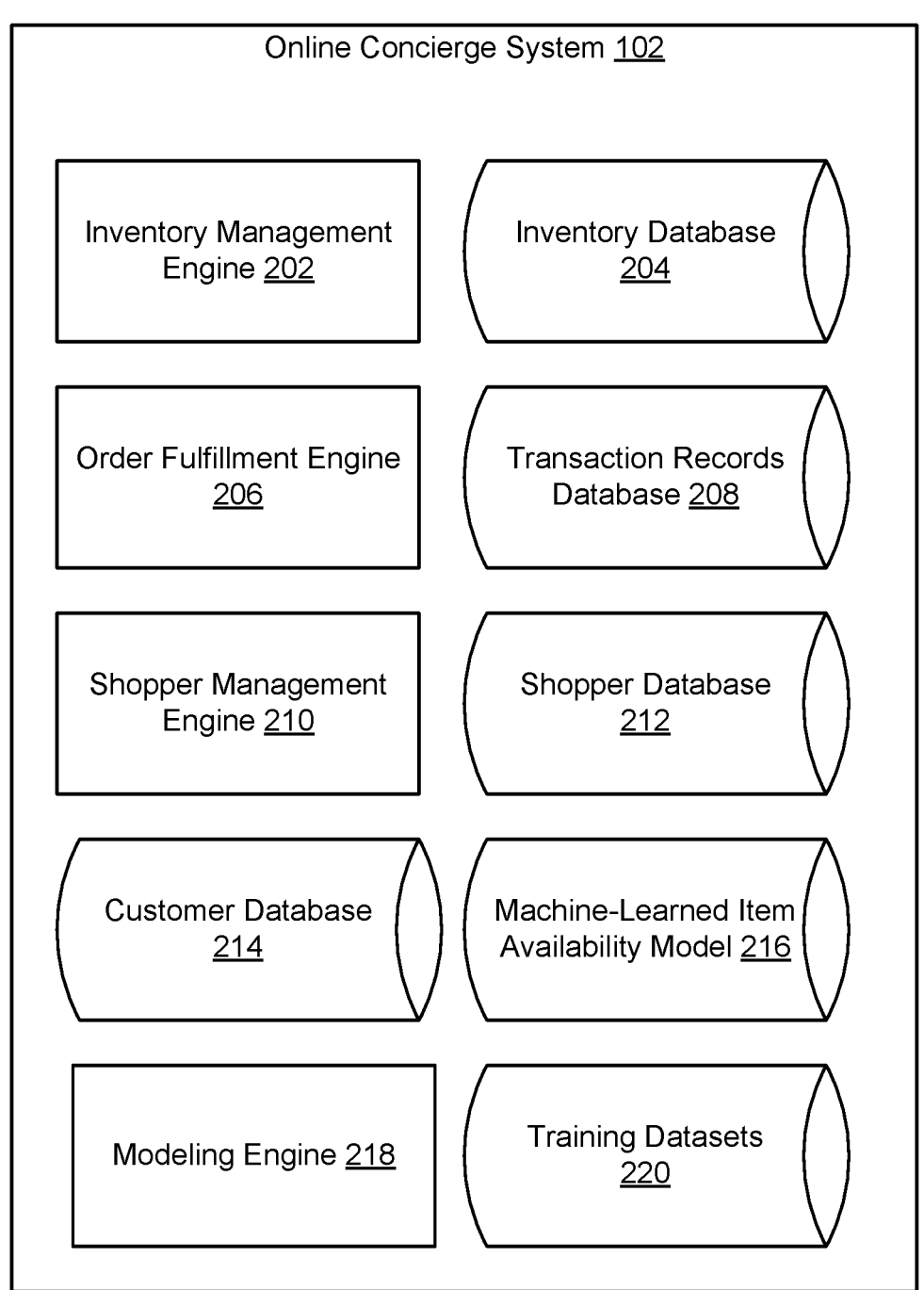
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIGS. 4 and 5.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

In various embodiments, the order fulfillment engine 206 generates and maintains an item graph, further described below in conjunction with FIGS. 6 and 7. The item graph identifies connections between pairs of items and attributes of items and between pairs of attributes of items. A connection between an item and an attribute indicates that the item has the attribute to which the item is connected. As further described below in conjunction with FIG. 7, the attributes of an item may be specified by information describing the product from a warehouse 110 providing the item or determined by the order fulfillment engine 206 based on information about the item received from the warehouse 110. A connection between an attribute and an additional attribute indicates that the attribute and the additional attribute have both occurred in one or more previously received orders for items. For example, the attribute is connected to the additional attribute if a previously received order included an item having the attribute and having another item having the additional attribute. Similarly, the attribute is connected to the additional attribute if a previously received order included an item having both the attribute and having the other attribute. As further described below in conjunction with FIG. 6, the order fulfillment engine 206 uses the item graph to generate search results of items in response to a search query received from a customer 104, allowing the order fulfillment engine 206 to leverage information about different attributes and items to increase a likelihood of identifying items that at least partially match the search query for inclusion in an order.

Machine Learning Model

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a customer or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine

218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the customer 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108, as described in further detail with reference to FIG. 5. Following updating of the training datasets 220, a modeling engine 218 may retrain a model with the updated training datasets 220 and produce a new machine-learned item availability model 216.

Customer Mobile Application

Figure 3A:
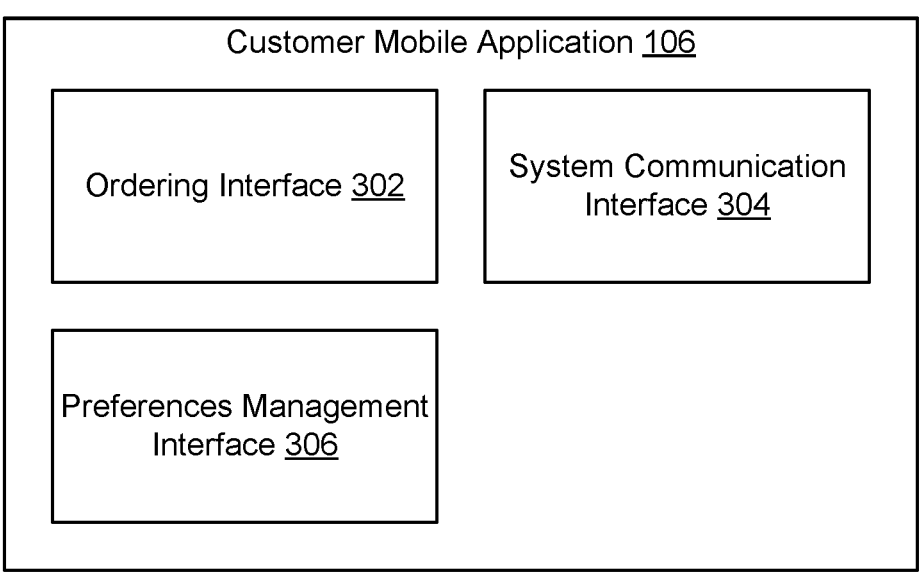
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, and so on.

Shopper Mobile Application

Figure 3B:
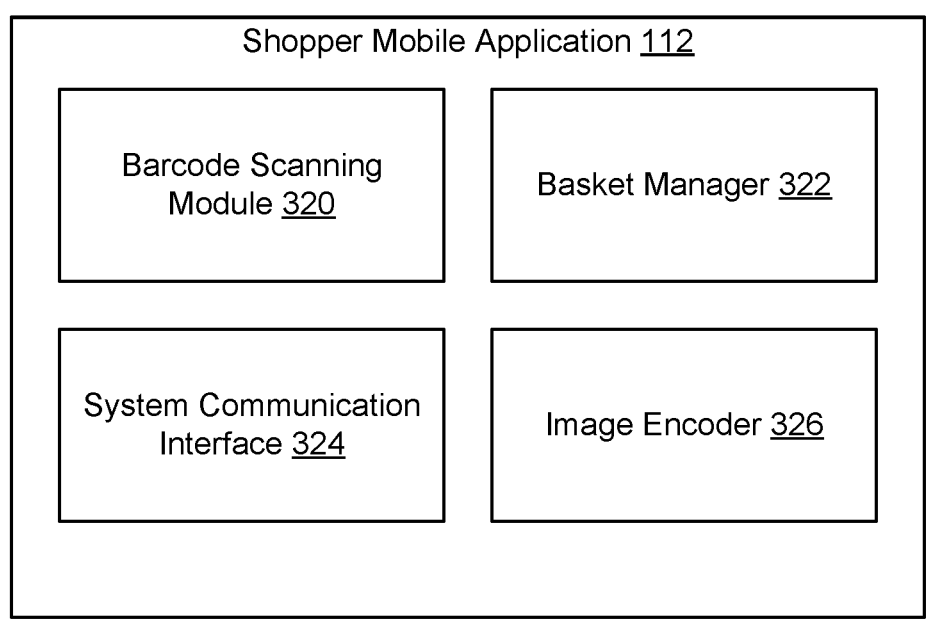
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned.

SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

As described with reference to FIG. 2, the machine-learned item availability model 216 of the online concierge system 102 can determine an availability of an item requested by the customer 104. FIG. 4 is a flowchart illustrating a process 400 for predicting inventory availability, according to one embodiment. The online concierge system 102 receives 402 a delivery order that includes a set of items and a delivery location. The delivery location may be any location associated with a customer, such as a customer's home or office. The delivery location may be stored with the customer location in the customer database 214. Based on the delivery order, the online concierge system 102 identifies a warehouse 404 for picking the set of items in the delivery order based on the set of items and the delivery location. In some cases, the customer specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a customer based on the probability predicted by the machine-learned item availability model 216.

Updating the Training Datasets

Figure 5:
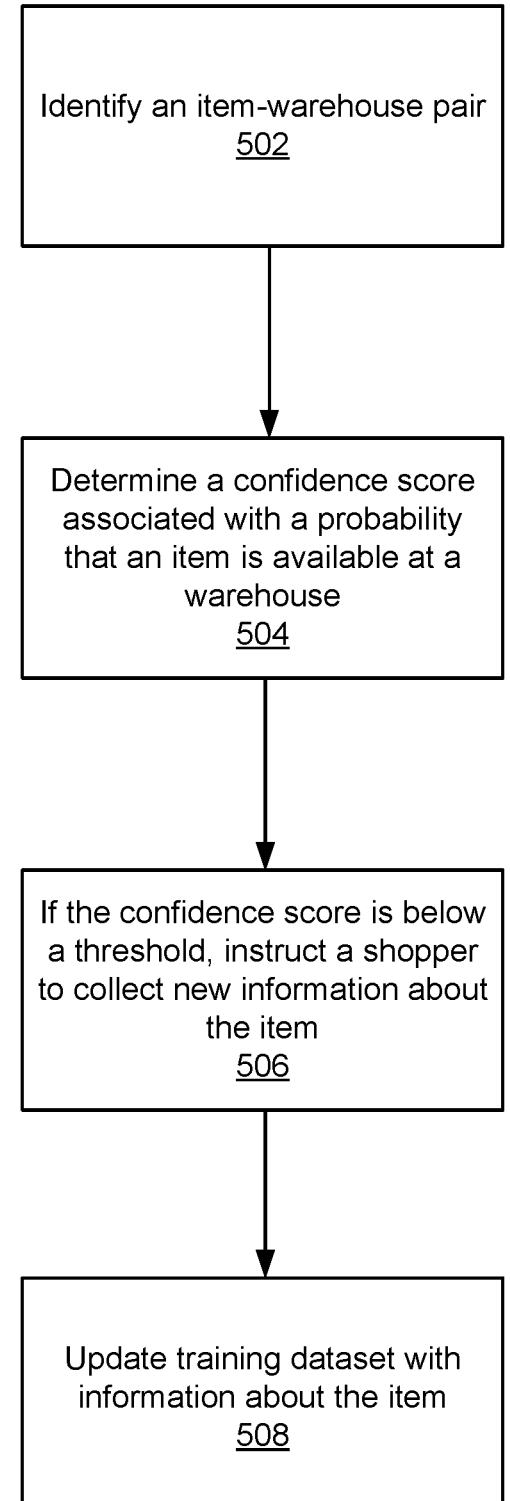
FIG. 5 is a flowchart of a process for updating training datasets for a machine-learned model, according to one embodiment.

FIG. 5 is a flowchart illustrating a process 500 for updating training datasets for a machine-learned model, according to one embodiment. The training datasets may be the training datasets 220 as shown in FIG. 2. While the training datasets 220 include large datasets of information collected from previous delivery orders (e.g., information identifying items and whether the items were available at a warehouse), certain items or warehouses might have less information associated with them in the training datasets 220 than other items or warehouses. For example, if an item is not frequently ordered, or has not been ordered for a long period of time, then it may be more difficult to build an accurate availability prediction in the machine-learned item availability model 216. One way to improve the ability of the machine-learned item availability model 216 to accurately predict item availability is to increase the information about the item in the training datasets 220 and add new information. For example, global attributes of items, such as items having one or more common attributes with an item, may be used when determining availability of infrequently ordered items. With larger and/or more recent datasets on the item, the modeling engine 218 can build more statistically meaningful connections between the machine-learning factors described with reference to FIG. 2 and the predicted item availability.

Process 500 thus improves the machine-learned item availability model 216 by increasing the datasets for particular items in the training datasets 220 with low confidence scores. Process 500 may be carried out by the online concierge system 102, e.g., by the inventory management engine 202 in conjunction with the shopper management engine 210, the item availability model 216, and the modeling engine 218. In some examples, process 500 is carried out by the online concierge system 102 following retrieving 406 a machine-learned model that predicts a probability that an item is available at a warehouse, as described in FIG. 4.

The online concierge system 102 (e.g., the inventory management engine 202 using the item availability model 216) identifies 502 an item-warehouse pair. For example, the item and warehouse in the item-warehouse pair may be an item in a received order and warehouse or potential warehouse for picking the items from the received order, e.g., to evaluate the suitability of the warehouse or likelihood of successfully picking the order before the order is picked.

As another example, the item-warehouse pair may be identified from items for which the availability predicted by the machine-learned item availability model 216 was incorrect (e.g., the item was predicted to be available and was determined by the shopper to be out of stock, or the item was predicted to be unavailable and the shopper was able to find it in the warehouse). For items for which the availability prediction was incorrect, the online concierge system 102 may determine if the items have sufficient associated information within the training datasets 220. If the online concierge system 102 determines that the incorrect probability was a result of insufficient or stale information in the training datasets 220, it may identify item-warehouse pairs and carry out process 500 to update the training datasets 220.

Additionally, or alternatively, item-warehouse pairs are identified from new items offered by the online concierge system 102. For new items, there may not be previous delivery order information relating the item availability to item characteristics, delivery order information, or time information in the training datasets 220. The lack of previous delivery orders may lead to a low confidence score for new items. The inventory management engine 202 may initiate the process 500 for new items until sufficient information about the items are collected in the training datasets 220 to improve the item availability confidence score associated with the items.

The online concierge system 102 (e.g., the inventory management engine 202 using the machine-learned item availability model 216) inputs the item, warehouse, and timing characteristics for the identified item-warehouse pair into the machine-learned item availability model 216 and determines 504 a confidence score associated with a probability that an item is available at the warehouse. The online concierge system 102 may determine probabilities and/or confidence scores for all or selected items in an inventory, e.g., items that are expected to be picked based on already-received orders, sales, promotions, holidays, weather, historical trends, or other factors. The confidence score is generated along with the item availability probability (also referred to as "availability") by the machine-learned item availability model 216. The confidence score may be an error associated with the availability probability. The confidence score indicates items that may not have enough training data in the training datasets 220 to generate a statistically significant link between the item's availability and information from the delivery order and/or item characteristics. In some alternate embodiments, the online concierge system 102 may identify, using the item availability model 216, item-warehouse pairs with a low confidence score, e.g., all item-warehouse pairs with a confidence score below a particular threshold. This list of item-warehouse pairs may be filtered, e.g., based on item popularity, predicted items to be ordered, warehouse, or one or more other factors.

In response to the determined confidence level of an item-warehouse pair being below a threshold, the online concierge system 102 (e.g., the shopper management engine 210) instructs 506 the shopper to collect new information about items with a confidence score below a threshold. A confidence score threshold may be an item availability probability between 0 and 1. A threshold confidence score may be 0.3, such that in response to a confidence score below 0.3, the shopper is instructed to collect new information about an item. In some embodiments, the online concierge system 102 also considers the availability probability for the item-warehouse pair. For example, if an item-warehouse pair has a confidence level slightly below the threshold, but a very low or very high availability probability, the online concierge system 102 may determine not to collect new information about the item-warehouse pair. In some embodiments, the threshold used for the confidence score may depend on the availability probability, or vice versa.

In response to the instruction, the shopper 108 determines whether the item is available at the warehouse. The shopper may be instructed to try to find the item at the warehouse, and indicate, through the SMA 112, whether the item is available. This information is transmitted to the online concierge system 102 via the shopper management engine 210 and used to update 508 the training datasets 220. In some embodiments, a shopper may be given a list of items with low confidence scores to seek within the warehouse. The online concierge system 102 updates 508 the training dataset 220 with new information about the item, which includes whether or not the item is available in the warehouse, and any additional item characteristics, warehouse information, or time information as described with respect to FIG. 2. The online concierge system 102 also updates the inventory database 204 based on the received information; e.g., if the inventory database 204 stores the time at which the item was most recently found or not found, this time will be updated based on the input from the shopper 108. In response to the new information collected by the shopper, the modeling engine 218 may update or retrain the machine learning item availability model 216 with the updated training datasets 220. Process 500 may be carried out by the online concierge system 102 until a confidence score associated with a probability that an item is available is above a threshold.

Use Case Examples

An example of process 500 used in conjunction with process 400 is described below. The online concierge system 102 receives 402 a delivery order from a customer 104 through the CMA 106. The customer 104 schedules a delivery at their home of three items to be delivered the following day. As an example, the customer 104 may order grated mozzarella, pizza dough, and tomato sauce, each of which is included in the delivery order. The online concierge system 102 sends the delivery order to the order fulfillment engine 206. The order fulfillment engine 206 uses the inventory management engine 202 and customer database 214 to identify 404 a warehouse for picking the requested items based on the items and the delivery location (i.e., the customer's home). A number of possible warehouses may be identified. For each possible warehouse, the order fulfillment engine 206 identifies 502 an item-warehouse pair with one of the items in the delivery order. Thus, a set of item-warehouse pairs is identified for each of the grated mozzarella, pizza dough and tomato sauce. The online concierge system 102 retrieves 406 the machine-learned item availability model 216 that predicts a probability that an item is available at the warehouse. The online concierge system 102 inputs the item, warehouse, and timing characteristics for each of the identified item-warehouse pairs into the machine-learned item availability model 216. The machine-learned item availability model 216 predicts 408 the probability that each of the grated mozzarella, pizza dough and tomato sauce are available at the identified warehouses. For each of the availability probabilities, the online concierge system 102 also determines 504 a confidence score associated with the probability from the machine-learned item availability model 216.

It is possible that the confidence score for pizza dough confidence score at one or more of the warehouses is below a threshold, given that people frequently make their own pizza dough and it may not be frequently ordered. Thus, pizza dough may have a relatively small and/or old associated dataset in the training dataset 220, leading to a low confidence score on the pizza dough availability probability within the machine-learned item availability model 216. The online concierge system 102, using the shopper management engine 210, instructs 506 a shopper to collect new information about pizza dough at one or more of the warehouses. The shopper management engine 210 may identify an off-duty shopper, or a shopper already at one of the warehouses identified 502 in an item-warehouse pair to collect information about whether or not pizza dough is available at the warehouse. The shopper management engine 210 transmits this instruction through the SMA 112. The shopper 108 may find that pizza dough is in fact available and transmit the availability to the online concierge system 102 through the SMA 112. This new information is used to update 508 the training dataset 220 and the inventory database 204. The shopper management engine 210 may transmit the same instruction to multiple shoppers 108 at different warehouses, or at different times, such that there is a larger set of data about pizza dough availability added to the training dataset 220, and more recent data in the inventory database 204.

In this example, the modeling engine 218 uses the updated training datasets 220 to retrain the machine-learned item availability model 216. The online concierge system 102 then re-inputs the pizza dough-warehouse pairs into the updated machine-learned item availability model 216 and determines 504 a confidence score associated with the probability that pizza dough is available at a number of possible warehouses. It is possible that the confidence scores are now above a threshold, because the increased data about pizza dough added to the training datasets 220 has improved the machine-learned item availability model 216, and/or the newer data in the inventory database 204 has improved the confidence score. The online concierge system 102 then generates 410 an instruction to a shopper 108 based on the availability probabilities for pizza dough. The instruction may be to pick the pizza dough at the warehouse with the highest availability probability. In other examples, the instruction may be to pick the pizza dough, grated mozzarella and tomato sauce at a warehouse with the highest availability probability for all of these items in the customer's delivery order. The online concierge system 102 transmits the instruction to a mobile device of the shopper 108.

Additionally, or alternatively, the online concierge system 102 may use the machine-learned item availability model 216 to predict an anticipated demand for an item at a warehouse. The online concierge system 102 may compare the number of times an item is included in a set of delivery orders to the item availability predictions generated by the machine-learned item availability model 216 and identify items that are frequently ordered but have low corresponding availability probabilities. For example, around the holidays, there may be an increase in delivery orders including Brussels sprouts, whereas Brussels sprouts may have a low availability prediction since they are not typically stocked in large quantities. The online concierge system may identify the discrepancy between a large volume of item orders and the low availability probability and convey this information to a warehouse 110. Additionally, or alternatively, the online concierge system 102 may transmit information about items that have availability predictions below a threshold.

Identifying Items for a Received Search Query

FIG. 6 is a flowchart of one embodiment of a method for identifying one or more items matching a search query received from a customer using an item graph maintained by an online concierge system 102. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments.

The online concierge system 102 receives 605 a search query from a customer 104 through the CMA 106. The search query includes one or more search terms for identifying one or more items the customer 104 seeks to purchase via the online concierge system 102. For example, the online concierge system 102 receives a selection of a warehouse 110 for fulfilling an order from the customer 104 then receives 605 a search query to identify one or more items offered by the selected warehouse 110.

However, search terms in the received search query may not correspond to specific items offered by the warehouse 110 or may partially identify multiple items offered by the warehouse 110. To identify items matching one or more of the search terms included in the search query, the online concierge system 102 retrieves 610 an item graph stored by the online concierge system 102. The item graph comprises a plurality of nodes, with each node corresponding to an item available through the online concierge system 102 or corresponding to an attribute of an item available through the online concierge system 102. Additionally, the item graph includes connections between various pairs of nodes. A connection between a node corresponding to an attribute and a node corresponding to an item indicates that the attribute is associated with the item. The online concierge system 102 generates the item graph based on a product catalog received from the warehouse 110, where each entry in the product catalog includes information identifying an item (e.g., an item identifier, an item name) and one or more attributes of the item. Example attributes of an item include: one or more keywords, a brand offering the item, a manufacturer of the item, a type of the item, and any other suitable information. Additionally, one or more attributes of an item may be specified by the online concierge system 102 for the item. Example attributes specified by the online concierge system 102 for an item include: a category for the item, one or more sub-categories for the item, and any other suitable information for the item. Attributes specified by the online concierge system 120 have corresponding nodes that are connected to a node for the item in the item graph.

In various embodiments, a connection between attributes in the item graph includes one or more values representing a measure of connectedness between the pair of attributes that are connected. The value included in a connection between attributes is based on prior customer actions when ordering items from the online concierge system 102. For example, a value of a connection between an attribute and an additional attribute is based on a frequency with which an item having the attribute is included in an order by a customer along with an item having the additional attribute. As another example, the value of the connection between the attribute and the additional attribute is based on a number of times an item having the attribute is included in an order by a customer along with an item having the additional attribute. In another example, the value of the connection between the attribute and the additional attribute is determined from a number of times (or a frequency with which) previously received orders included an item having both the attribute and the additional attribute. The online concierge system 102 modifies the measure of connectedness between attributes in the item graph over time as customers include items connected to various attributes in orders received by the online concierge system 102. This allows the online concierge system 102 to maintain information identifying relationships between different attributes of items as well relationships between attributes and items based on items included in orders previously received by the online concierge system 102 and information about items received by the online concierge system 102.

Figure 7:
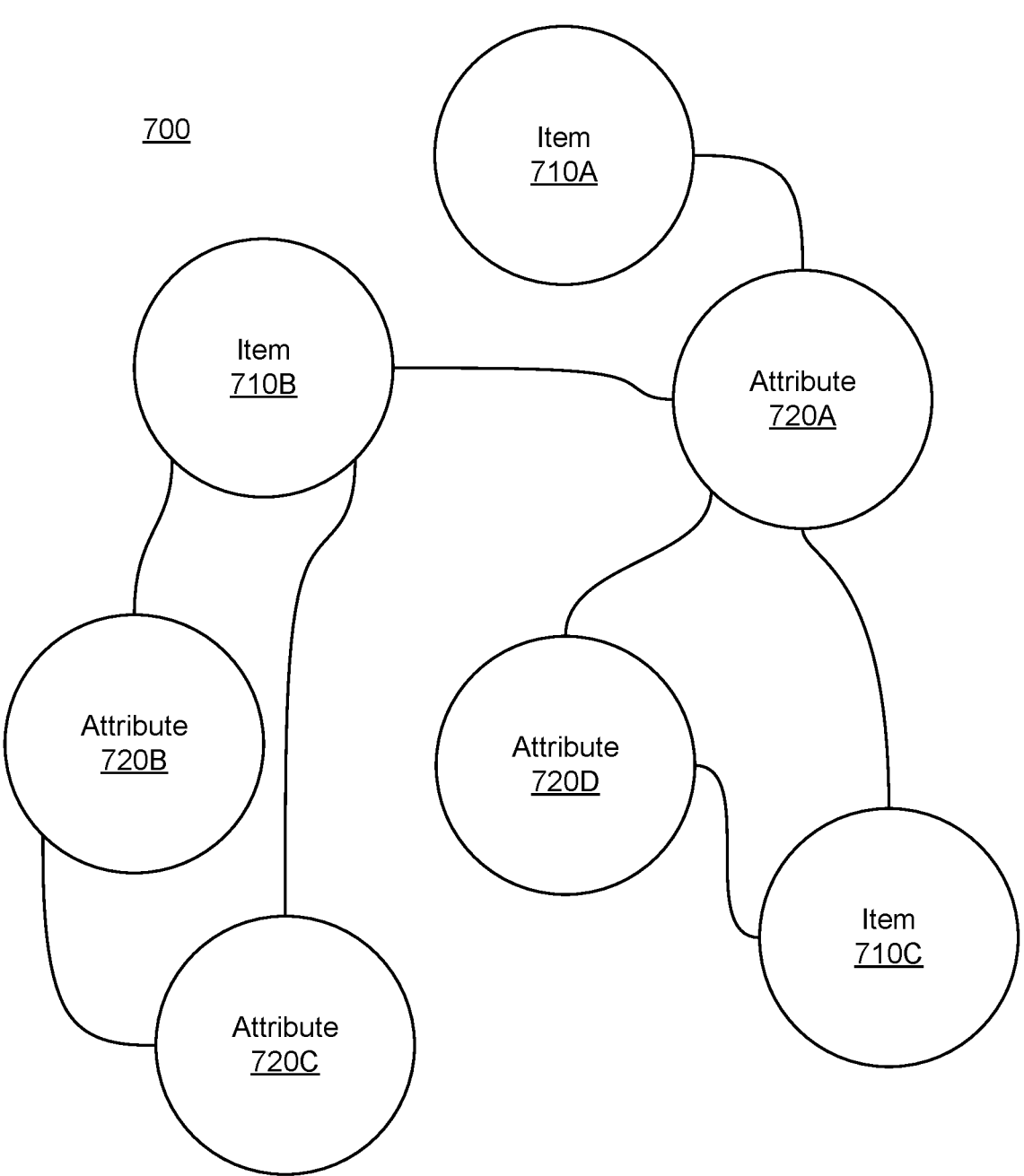
FIG. 7 is an example of an item graph maintained by an online concierge system, according to one embodiment.

FIG. 7 shows an example item graph 700 maintained by the online concierge system 102. As further described above in conjunction with FIG. 6, the item graph includes items offered by the online concierge system 102 and attributes of the items, along with connections between items and between items and attributes. In the example of FIG. 7, the item graph 700 includes nodes for item 710A, item 710B, and item 710C (also referred to individually and collectively using reference number 710). The item graph 700 also includes nodes for attribute 720A, attribute 720B, attribute 720C, and attribute 720D (also referred to individually and collectively using reference number 720). A connection between an item 710 and an attribute 720 in the item graph 700 indicates that the item 710 has the attribute 720 based on information about the items 710 obtained by the online concierge system 102. Referring to FIG. 7, item 710A is connected to attribute 720A, indicating that item 710A has attribute 720A. Similarly, item 710B is connected to attribute 720B and attribute 720C because item 710B has attribute 720B and attribute 720C. Because item 710C has attribute 720A and attribute 720D, item 710C is connected to attribute 720A and to attribute 720D in the item graph 700.

Connections between items 710 and attributes 720 are based on information about items 710 obtained by the online concierge system 102. For example, the online concierge system 102 receives a product catalog from a warehouse 110 identifying items 710 offered for purchase by the warehouse 110. Each entry in the product catalog includes information identifying an item 710 and one or more attributes 720 associated with the item. The online concierge system 102 generates the item graph 700 so the item 710 has a connection to each attribute 720 associated with the item by the product catalog. Additionally, attributes 720 of an item 710 may be specified by the online concierge system 102, such as one or more categories or descriptions associated with the item 710 by the online concierge system 102, with the item graph 700 establishing connections between the item 710 and attributes of the item 710 specified by the online concierge system 102.

The item graph 700 also includes connections between pairs of attributes. As further described above in conjunction with FIG. 6, a connection between attributes indicates that items having the attributes were included in previous orders received from customers. Hence, a connection between attributes is based on cooccurrence of items having the attributes in orders received by the online concierge system 102. For example, the connection between attribute 720A and attribute 720D in FIG. 7 indicates that one or more orders the online concierge system 102 received from customers included an item having attribute 720A and included another item having attribute 720D. Similarly, a connection between attribute 720B and attribute 720C indicates the online concierge system 102 received one or more orders from customers including an item 710 having attribute 720B and an item having attribute 720C. As further described above in conjunction with FIG. 6, a connection between a pair of attributes 720 includes a value between the pair of attributes 720. In various embodiments, the value of a connection between an attribute 720 and another attribute 720 is based on a number of times the online concierge system 102 receives an order including an item having the attribute 720 and including an item having the other attribute 720; similarly, the value of the connection between the attribute 720 and the other attribute 720 is based on a frequency with which the online concierge system 102 receives an order including an item having the attribute 720 and including an item having the other attribute 720. Additionally, a connection between an item and another item may be established when the online concierge system 102 receives an order including the item and the additional item or when the online concierge system 102 receives a selection of the item and of the additional item when the item and the additional item are presented are results to a prior search query. Based on a connection between the item and the additional item, the online concierge system 102 establishes a connection between attributes of the item and attributes of the additional item. Hence, the online concierge 102 may leverage inclusion of an item and an additional item in an order or selection of different items from search results to infer connections between attributes of the item and attributes of the additional item.

Referring back to FIG. 6, the online concierge system 102 segments 615 the received search query into tokens, with each token comprising one or more search terms included in the search query. The online concierge system 102 may use any suitable method for segmenting 615 the received search query. For example, the online concierge system 102 identifies one or more specific delimiter characters in the received search query and segments 615 the search terms in the search query into tokens separated by the specific delimiter characters. As an example, a specific delimiter character is a space, so the online concierge system 102 segments 615 the received search query into tokens that are individual words included in the search query, so an example search query of "organic whole milk" is segmented into "organic," "whole," and "milk." Alternatively, the online concierge system 102 maintains a trained machine learned model for segmenting 615 the received search query into tokens and applies the trained machine learned model to the received search query to segment 615 the received search query into tokens.

From the tokens identified from the search query, the online concierge system 102 generates 620 combinations of tokens. In some embodiments, the online concierge system 102 generates 620 each possible combination of tokens from the segmented search query. Alternatively, the online concierge system 102 generates a specific number of different combinations of tokens from the segmented search query. The online concierge system 102 may maintain a parameter identifying the specific number of combinations of tokens that are generated 620.

The online concierge system 102 compares 625 each generated combination of tokens to nodes in the item graph. When comparing 625 a combination of tokens to nodes in the item graph accounts for connections between an attribute in the item graph or an item in the item graph matching one or more tokens in the combination and connections between the item or attribute matching one or more of the tokens in the combination and other attributes or items. When a combination of tokens includes one or more tokens matching an attribute in the item graph, the online concierge system 102 traverses the item graph using connections between the attribute matching one or more of the tokens in the combination to identify an item connected to the attribute matching one or more of the tokens in the combination.

Items connected to one or more attributes matching one or more tokens in the combination are identified 630 as candidate items for display as search results.

In various embodiments, the online concierge system 102 stores a mapping between tokens and alternative terms. For example, the mapping associates a token with one or more synonyms for the token. When comparing 625 a combination of tokens to the nodes in the item graph, the online concierge system 102 retrieves synonyms for one or more tokens from the mapping and compares one or more synonyms for a token to nodes in the item graph, allowing the online concierge system 102 to account for variations in how different customers provide search terms for one or more items to the online concierge system 102. In various embodiments, the online concierge system 102 generates the mapping based on search terms previously received from customers and attributes of items that the customers selected for inclusion in orders after receiving search results for the previously received search terms.

When comparing 625 a combination of tokens to the item graph, the online concierge system 102 accounts for connections between attributes to identify 630 candidate items. In various embodiments, the online concierge system 102 determines an additional attribute connected to the attribute matching one or more tokens in the combination via the item graph and identifies 630 an item connected to the additional attribute as a candidate item for display. In various embodiments, the online concierge system 102 determines 635 a score for candidate item based on a number of attributes that match one or more tokens in the combination connected to the candidate item based on connections between the candidate item and attributes in the item graph. The online concierge system 102 may determine 635 a score for each identified candidate item or for each of at least a set of the identified candidate items. Hence, a candidate item connected to a greater number of attributes matching one or more tokens in the combination has a higher score. Additionally, when scoring a candidate item, the online system 102 may account for a number of connections between the candidate item and an attribute matching one or more tokens in the combination. For example, the online concierge system 102 assigns a weight to the attribute matching one or more tokens in the combination that is inversely related (e.g., inversely proportional) to a number of connections between the candidate item and one or more attributes matching one or more tokens in the combination. The score for the candidate item is determined by combining the weighted attributes matching one or more tokens of the combination connected to the candidate item. When determining 635 the score for a combination of tokens, the online concierge system 102 may generate a score for the combination based on comparison of different synonyms for tokens in the combination to the item graph, and determine 635 the score for the combination of tokens as a maximum score of the scores determined for different synonyms of the tokens in the combinations. This allows the online concierge system 102 to leverage connections between attributes in the item graph to identify 530 candidate items based on a search query, while accounting for distance between candidate items and attributes matching one or more tokens in a combination generated from the search query.

When scoring a candidate item, the online concierge system 102 may account for prior actions by customers 104. As described above, a connection between an attribute and another attribute may include a value based on inclusion of an item having the attribute in previously received orders along with one or more other items having the other attribute or inclusion of an item having both the attribute and the additional attribute in received orders. In various embodiments, a weight of a connection between a candidate item and attribute that is connected to an additional attribute that matches one or more tokens in the combination is modified based on the value of the connection between the attribute and the additional attribute. For example, greater values of the connection between the attribute and the additional attribute increase the weight of the connection between the candidate item and the attribute, while lower values of the connection between the attribute and the additional attribute decrease the weight of the connection between the candidate item and the attribute. This allows the online concierge system 102 to account for prior interactions by customers with items having different attributes when determining relatedness or similarity between the different attributes. As the value of a connection between an attribute and an additional attribute may change as the online concierge system 102 receives orders from customers, the similarity between attributes connected to each other in the item graph may be modified over time.

Based on the scores determined 635 determined for candidate items identified 630 for one or more combinations of tokens from the search query, the online concierge system 102 generates 640 a ranking of candidate items. In some embodiments, the online concierge system 102 generates 640 a ranking of candidate items identified 630 for each combination of tokens from the search query. Alternatively, the online concierge system 102 generates 640 the ranking to include candidate items satisfying one or more criteria. For example, the online concierge system 102 selects candidate items having at least a threshold score and generates 640 the ranking from the selected candidate items. In various embodiments, the online concierge system 102 generates 640 the ranking so candidate items with higher scores have higher positions in the ranking. Additionally or alternatively, attributes of the candidate items are provided as input to a trained model, which uses the attributes to generate 640 a ranking of the candidate items. The ranking generated 640 by the trained model may be for a specific goal, such as a ranking to maximize a likelihood of user interaction with the ranking, in some embodiments.

Based on the ranking, the online concierge system 102 transmits 645 search results including one or more of the candidate items to a client device (e.g., a mobile device or a computer displaying the customer mobile application 106) of the customer 104 for display. For example, the online concierge system 102 selects candidate items having at least a threshold position in the ranking and displays 645 the selected candidate items as the search results. In some embodiments, the online concierge system 102 maintains different threshold positions for different types of items. For example, the online concierge system 102 receives compensation for displaying certain items in search results, and the online concierge system 102 maintains the threshold position for items for which the online concierge system 102 does not receive compensation for displaying, while maintaining an alternative threshold position for items for which the online concierge system 102 receives compensation for displaying. The alternative threshold position may be lower in the ranking than the threshold position in various embodiments. The online concierge system 102 may include a specific number of items (or percentage of items) for which the online concierge system 102 receives compensation for displaying in the search results, so the online concierge system 102 selects the specific number of items for which the online converge system 102 receives compensation for displaying that have at least the threshold position in the ranking, while selecting the remaining items, for which the online concierge system 102 does not receive compensation for displaying, as items having at least the threshold position in the ranking. The search results display the candidate items in an order determined by the ranking in various embodiments. Alternatively, the online converge system 102 selects candidate items having at least a threshold score and displays the selected candidate items as the search results. This allows the online concierge system to provide candidate items more likely to match the search query by accounting for connections between attributes that may match the search query generated from previously received search queries as well as attributes identified for specific products, increasing information that may be evaluated against the received search query.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

maintaining an item graph in a memory of an online system comprising a plurality of nodes and a plurality of edges connecting the nodes, wherein the item graph is generated by:

generating a plurality of item nodes that each represents an item and a plurality of attribute nodes that each represents an attribute; and generating the plurality of edges that indicates connections between item and attribute nodes, wherein a connection between an item node and an attribute node indicates that the corresponding item has the corresponding attribute, wherein a connection between two item nodes indicates a value presenting a co-occurrence of the corresponding items in historical orders, and wherein a connection between two attribute nodes indicates a value representing a co-occurrence of the corresponding attribute in historical orders;

receiving a plurality of new orders over a computer network from a plurality of different users;

responsive to receiving the plurality of new orders, updating the memory of the online system to update the item graph to include values representing the co-occurrences of the plurality of edges of the item graph based on the co-occurrences of items and attributes in the plurality of new orders;

receiving, at an online concierge system, a search query including one or more search terms for a customer;

performing language processing on the search query to generate one or more combinations of search terms based on the search query;

identifying candidate items from the updated item graph by identifying one or more item nodes that are connected in the updated item graph to node that matches one or more of the generated combinations of search terms;

generating a score for each of the identified candidate items by, for each identified candidate item:

identifying the edge in a path in the update item graph that connect the corresponding item node and the node that matched one or more of the generated combinations of search terms;

retrieving, from the updated item graph, the values associated with the identified edges; and generating the score for the identified candidate items based on the retrieved values;

selecting one or more of the identified candidate items based on the scores; and transmitting search results comprising the selected one or more identified candidate items to a client device for display to the customer.

2. The method of claim 1, wherein identifying candidate items from the item graph comprises:

identifying a candidate item corresponding to an item node having at least one connection in the item graph to an attribute node matching one or more search terms in a combination of search terms.

3. The method of claim 2, wherein generating the score for each of the identified candidate items further comprises:

determining a score for the identified candidate item based on a set of attribute nodes matching one or more search terms in the combination of search terms connected to the item node corresponding to the identified candidate item in the item graph.

4. The method of claim 3, wherein determining the score for the identified candidate item based on the set of attribute nodes matching one or more search terms in the combination of search terms connected to the item node corresponding to the identified candidate item in the item graph comprises:

assigning a weight to each attribute node matching one or more search terms in the combination of search terms based on a set of connections between the attribute node matching one or more search terms in the combination of search terms and the item node corresponding to the identified candidate item; and determining the score for the identified candidate item comprising combining the weighted attribute nodes matching one or more search terms in the combination of search terms.

5. The method of claim 1, wherein identifying candidate items from the item graph comprises:

retrieving a mapping between one or more of the search terms and alternative terms; and comparing search terms in a combination of search terms and alternative terms mapped to the search terms in the combination of search terms to the item graph.

6. The method of claim 1, wherein generating the score for each of the identified candidate items further comprises:

determining a plurality of values for a candidate item, each value corresponding to comparison of search terms in the combination of search terms to the item graph or corresponding to comparison of alternative terms mapped to one or more search terms in the combination of search terms to the item graph; and selecting the value for the candidate item as a maximum value of the plurality of value.

7. The method of claim 5, wherein the mapping between one or more search terms and alternative terms is based on search terms previously received from one or more customers and attributes of items selected for inclusion in orders by the one or more customers after receiving search results for the search terms previously received.

8. The method of claim 1, wherein selecting one or more of the identified candidate items based on the scores comprises:

ranking the candidate items based on their corresponding scores; and selecting one or more candidate items having at least a threshold position in the ranking.

9. A computer program product comprising a non-transitory computer readable storage medium having instructions encoded thereon that, when executed by a processor, cause the processor to:

maintain an item graph in a memory of an online system comprising a plurality of nodes and a plurality of edges connecting the nodes, wherein the item graph is generated by:

generating a plurality of item nodes that each represents an item and a plurality of attribute nodes that each represents an attribute; and generating the plurality of edges that indicates connections between item and attribute nodes, wherein a connection between an item node and an attribute node indicates that the corresponding item has the corresponding attribute, wherein a connection between two item nodes indicates a value representing a co-occurrence of the corresponding items in historical orders, and wherein a connection between two attribute nodes indicates a value representing a co-occurrence of the corresponding attribute in historical orders;

receive a plurality of new orders over a computer network from a plurality of different users;

responsive to receiving the plurality of new orders, update the memory of the online system to update the item graph to include values representing the co-occurrences of the plurality of edges of the item graph based on the co-occurrences of items and attributes in the plurality of new orders;

receive, at an online concierge system, a search query including one or more search terms from a customer;

perform language processing on the search query to generate one or more combinations of search terms based on the search query;

identify candidate items from the updated item graph by identifying one or more item nodes that are connected in the updated item graph to a node that matches one or more of the generated combinations of search terms;

generate a score for each of the identified candidate items by, for each identified candidate item:

identifying the edges in a path in the updated item graph that connect the corresponding item node and the node that matches one or more of the generated combination of search terms;

retrieving, from the updated item graph, the values associated with the identified edges; and generating the score for the identified candidate items based on the retrieved values;

select one or more of the identified candidate items based on the scores; and transmit search results comprising the selected one or more identified candidate items to a client device for display to the customer.

10. The computer program product of claim 9, wherein identifying candidate items from the item graph comprises:

identifying a candidate item corresponding to an item node having at least one connection in the item graph to an attribute node matching one or more search terms in a combination of search terms.

11. The computer program product of claim 10, wherein generating the score for each of the identified candidate items further comprises:

determining a score for the identified candidate item based on a set of attribute nodes matching one or more search terms in the combination of search terms connected to the item node corresponding to the identified candidate item in the item graph.

12. The computer program product of claim 11, wherein determining the score for the identified candidate item based on the set of attribute nodes matching one or more search terms in the combination of search terms connected to the item node corresponding to the identified candidate item in the item graph comprises:

assigning a weight to each attribute node matching one or more search terms in the combination of search terms based on a set of connections between the attribute node matching one or more search terms in the combination of search terms and the item node corresponding to the identified candidate item; and determining the score for the identified candidate item comprising combining the weighted attribute nodes matching one or more search terms in the combination of search terms.

13. The computer program product of claim 9, wherein identifying candidate items from the item graph comprises:

retrieving a mapping between one or more of the search terms and alternative terms; and comparing search terms in a combination of search terms and alternative terms mapped to the search terms in the combination of search terms to the item graph.

14. The computer program product of claim 9, wherein generating the score for each of the identified candidate items further comprises:

determining a plurality of values for a candidate item, each value corresponding to comparison of search terms in the combination of search terms to the item graph or corresponding to comparison of alternative terms mapped to one or more search terms in the combination of search terms to the item graph; and selecting the value for the candidate item as a maximum value of the plurality of value.

15. The computer program product of claim 13, wherein the mapping between one or more search terms and alternative terms is based on search terms previously received from one or more customers and attributes of items selected for inclusion in orders by the one or more customers after receiving search results for the search terms previously received.

16. The computer program product of claim 9, wherein selecting one or more of the identified candidate items based on the scores comprises:

ranking the candidate items based on their corresponding scores; and selecting one or more candidate items having at least a threshold position in the ranking.

17. A system comprising:

a processor; and a non-transitory computer readable storage medium having instructions encoded thereon that, when executed by the processor, cause the system to:

maintain an item graph in a memory of an online system comprising a plurality of nodes and a plurality of edges connecting the nodes, wherein the item graph is generated by:

generating a plurality of item nodes that each represents an item and a plurality of attribute nodes that each represents an attribute; and generating the plurality of edges that indicates connections between item and attribute nodes, wherein a connection between an item node and an attribute node indicates that the corresponding item has the corresponding attribute, wherein a connection between two item nodes indicates a value representing a co-occurrence of the corresponding items in historical orders, and wherein a connection between two attribute nodes indicates a value representing a co-occurrence of the corresponding attribute in historical orders;

receive a plurality of new orders over a computer network from a plurality of different users;

responsive to receiving the plurality of new orders, update the memory of the online system to update the item to include values representing the co-occurrences of the plurality of edges of the item graph based on the co-occurrences of items and attributes in the plurality of new orders;

receive, at an online concierge system, a search query including one or more search terms from a customer;

perform language processing on the search query to generate one or more combinations of search terms based the search query;

identify candidate items from the item graph by identifying one or more nodes in the item graph that match the generated combinations of search terms;

generate a score for each of the identified candidate items based on connections between the identified attribute nodes and the identified item nodes in the item graph, wherein generating the score comprises:

for each identified candidate item, generating a connection value between the corresponding candidate item node and each identified attribute node;

updating information identifying relationships between different items and attributes based on items included in newly received orders; and modifying the connection value based on the updated information;

select one or more of the identified candidate items based on the scores; and transmit search results comprising the selected one or more identified candidate items to a client device for display to the customer.

18. The system of claim 17, wherein the instructions to identify candidate items from the item graph comprise instruction, when executed by the processor, cause the system to:

identify a candidate item corresponding to an item node having at least one connection in the item graph to an attribute node matching one or more search terms in a combination of search terms.

* * * * *